(12) United States Patent
Hikichi

(10) Patent No.: US 9,769,344 B2
(45) Date of Patent: Sep. 19, 2017

(54) INFORMATION PROCESSING APPARATUS THAT CONTROLS DISPLAY OF DISPLAY UNIT, AND CONTROL METHOD THEREFOR AND STORAGE MEDIUM

(71) Applicant: CANON KABUSHIKI KAISHA, Tokyo (JP)

(72) Inventor: Atsushi Hikichi, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/372,710

(22) Filed: Dec. 8, 2016

(65) Prior Publication Data
US 2017/0187902 A1    Jun. 29, 2017

(30) Foreign Application Priority Data
Dec. 25, 2015   (JP) .................... 2015-254089

(51) Int. Cl.
*H04M 11/00*   (2006.01)
*H04N 1/00*   (2006.01)
*H04N 1/327*   (2006.01)

(52) U.S. Cl.
CPC ........ *H04N 1/00904* (2013.01); *H04N 1/0048* (2013.01); *H04N 1/00395* (2013.01); *H04N 1/00411* (2013.01); *H04N 1/32728* (2013.01); *H04M 2201/52* (2013.01); *H04M 2203/2066* (2013.01); *H04N 2201/0093* (2013.01); *H04N 2201/0094* (2013.01); *H04N 2201/3204* (2013.01)

(58) Field of Classification Search
CPC ........... H04N 1/00904; H04N 1/00395; H04N 1/00411; H04N 1/0048; H04N 1/32728; H04N 2201/0093; H04N 2201/0094; H04N 2201/3204; H04M 2203/2066; H04M 2201/52
See application file for complete search history.

(56) References Cited

U.S. PATENT DOCUMENTS

| 2013/0083910 | A1* | 4/2013 | Baba | H04M 11/007 379/100.01 |
| 2014/0369490 | A1* | 12/2014 | Koizumi | H04M 1/82 379/377 |
| 2015/0138581 | A1* | 5/2015 | Aso | H04N 1/00896 358/1.13 |

FOREIGN PATENT DOCUMENTS

| JP | 11027441 A | * 1/1999 |
| JP | 2000013523 A | 1/2000 |

* cited by examiner

*Primary Examiner* — Stella Woo
(74) *Attorney, Agent, or Firm* — Rossi, Kimms & McDowell LLP

(57) ABSTRACT

An information processing apparatus capable of preventing a user from unnecessarily taking a wasteful action. Whether a communication line is connected to the information processing apparatus and an off-hook state in the information processing apparatus are detected. Whether to turn on a display unit is controlled. When connection of the communication line to the information processing apparatus and the off-hook state are detected the display unit is controlled to turn on. When non-connection of the communication line to the information processing apparatus and the off-hook state are detected, the display unit is controlled not to turn on.

9 Claims, 11 Drawing Sheets

INFORMATION PROCESSING APPARATUS THAT CONTROLS DISPLAY OF DISPLAY UNIT, AND CONTROL METHOD THEREFOR AND STORAGE MEDIUM

BACKGROUND OF THE INVENTION

Field of the Invention

The present invention relates to an information processing apparatus, a control method therefor, and a storage medium, and particularly to an information processing apparatus that controls display of a display unit, and a control method therefor and a storage medium.

Description of the Related Art

Recently, high performance has been achieved in an image forming apparatus as an information processing apparatus, and such an apparatus has not only a copy function to scan and print a document but also a FAX function to perform FAX communication in a state of being connected to a phone line or a network line and a call function to make a call via a handset or an extension. In addition, power saving has been also achieved in the image forming apparatus, and such an apparatus also has a power saving function to stop energization with respect to some devices of the image forming apparatus when a user does not use the image forming apparatus and to turn off a display screen that receives a user's operation. In the image forming apparatus having the above-described power saving function, the apparatus is transitioned from a low power state where the display screen is turned off to a standby state where the display screen is turned on when the user attempts to use the image forming apparatus. For example, Japanese Laid-Open Patent Publication (Kokai) No. 2000-13523 discloses a communication apparatus that is transitioned from a low power state to a standby state when a handset or an extension is off-hooked. In the communication apparatus disclosed in Japanese Laid-Open Patent Publication (Kokai) No. 2000-13523, the user who has off-hooked the handset or the extension inputs a phone number of a communication destination into the turned-on display screen to use a call function or a FAX function.

Among communication apparatuses, however, there is a case where a phone line cable is not inserted in the communication apparatus. In this case, it is difficult for the user to use the call function or the FAX function although it is possible to input the phone number of the communication destination into the display screen even if the communication apparatus is transitioned to the standby state. That is, when the communication apparatus disclosed in Japanese Laid-Open Patent Publication (Kokai) No. 2000-13523 is in a state where the call function or the FAX function is not available, the user realizes such a state only after inputting the phone number of the communication destination into the display screen. As a result, the user unnecessarily takes a wasteful action.

SUMMARY OF THE INVENTION

The present invention provides an information processing apparatus that is capable of preventing a user from unnecessarily taking a wasteful action, and a control method therefor and a storage medium.

Accordingly, the present invention provides an information processing apparatus provided with a display unit, comprising a first detection unit configured to detect whether a communication line is connected to the information processing apparatus, a second detection unit configured to detect an off-hook state in the information processing apparatus, and a display control unit configured to control whether to turn on the display unit, wherein the display control unit turns on the display unit when the first detection unit detects connection of the communication line to the information processing apparatus and the second detection unit detects the off-hook state, and wherein the display control unit does not turn on the display unit when the first detection unit detects non-connection of the communication line to the information processing apparatus and the second detection unit detects the off-hook state.

According to the present invention, it is possible to prevent the user from unnecessarily taking a wasteful action.

Further features of the present invention will become apparent from the following description of exemplary embodiments (with reference to the attached drawings).

DESCRIPTION OF THE EMBODIMENTS

Hereinafter, embodiments of the present invention will be described with reference to the drawings.

Figure 1:
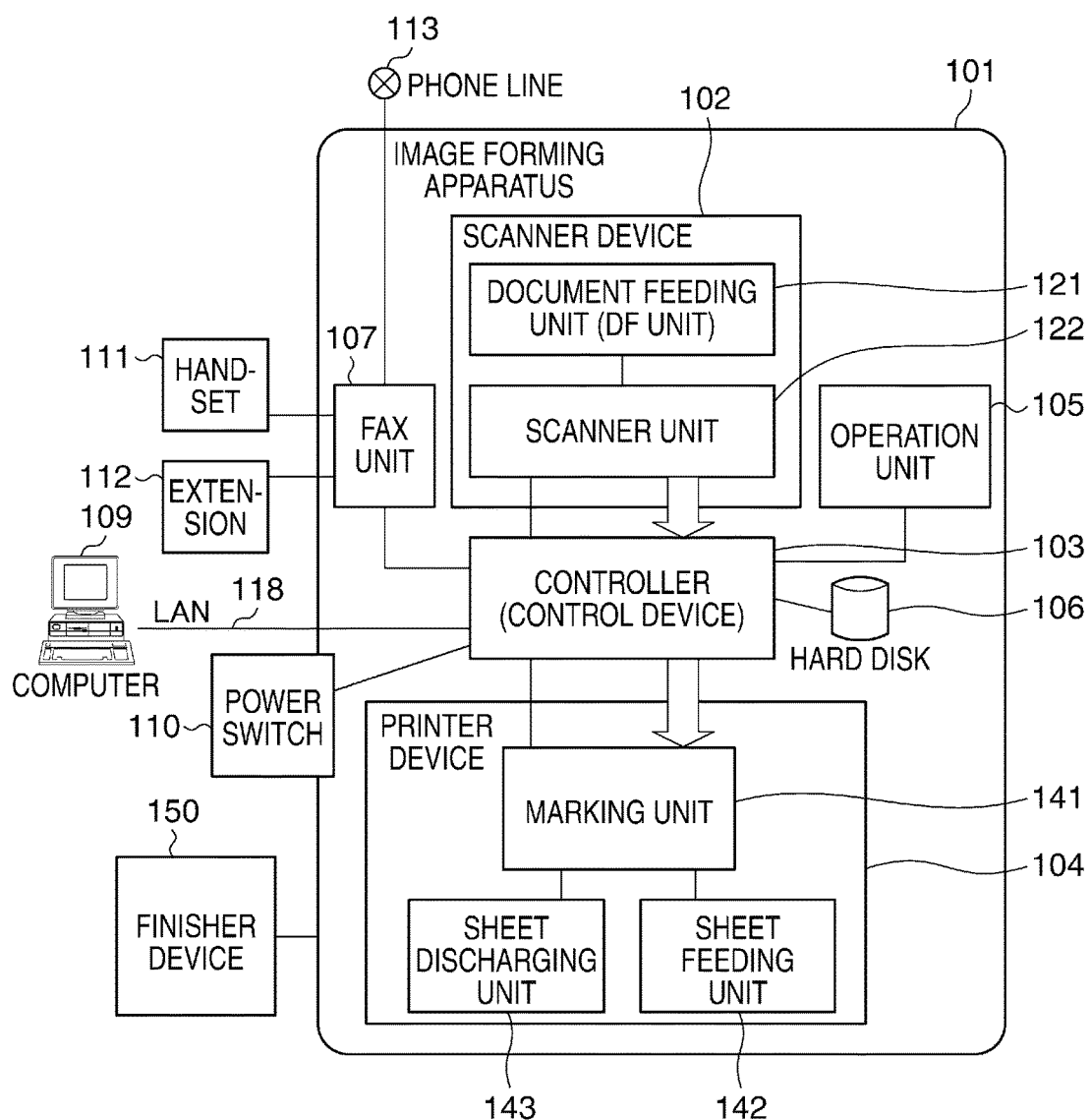
FIG. 1 is a diagram schematically showing a configuration of an image forming system that includes an image forming apparatus as an information processing apparatus according to a first embodiment of the present invention.

FIG. 1 is a diagram schematically showing a configuration of an image forming system that includes an image forming apparatus 101 as an information processing apparatus according to a first embodiment of the present invention. In the present embodiment, the image forming apparatus 101 is a multifunction machine that is capable of executing, for example, a call function, a FAX function, a print function, a scan function, a data communication function and the like.

In FIG. 1, the image forming apparatus 101 is provided with a scanner device 102, a controller 103, a printer device 104, an operation unit 105, a hard disk (also referred to as the HDD) 106, and a FAX unit 107.

The scanner device 102 includes a document feeding unit 121, which is capable of automatically replacing a document bundle, and a scanner unit 122 which optically reads an image from a document and coverts the image into image data. The image data converted by the scanner unit 122 is transmitted to the controller 103. The controller 103 is connected to each module of the scanner device 102, the printer device 104, the operation unit 105, the HDD 106, and the FAX unit 107 and comprehensively controls the image forming apparatus 101 by issuing an instruction to each module thereof. The printer device 104 includes a sheet feeding unit 142 which is capable of feeding sheets one by one from a sheet bundle, a marking unit 141 which prints the image data onto the fed sheet, and a sheet discharging unit 143 which discharges the printed sheet. The printer device 104 outputs the image data onto a paper medium such as a sheet.

The operation unit 105 is provided with an LCD touch panel 500 (a display unit) to be described later, a hard key, and the like, and receives setting with respect to the image forming apparatus 101 from a user via the LCD touch panel 500 and the like. The HDD 106 stores image data, a control program for the image forming apparatus 101, and the like. The FAX unit 107 transmits or receives image data to or from an external apparatus (not shown) through a phone line 113 (a communication line) or the like. In addition, the FAX unit 107 is connected to a handset 111 which does not have a number input key at a reception unit thereof and an extension 112 which has a number input key at a reception unit thereof. The handset 111 and the extension 112 are generally used as a telephone, and may be used for FAX information service of voice response, an external caller using a telephone operator, or manual transmission and reception of FAX which can be executed using an off-hook key 605 (see FIG. 6) to be described later. The call function and the FAX function that use the phone line 113 are executed by off-hook of the handset 111 and the extension 112 or pressing of the off-hook key 605.

A finisher device 150 is connected to the image forming apparatus 101, and the finisher device 150 performs processing such as sorting, stapling, punching and cutting with respect to the sheet discharged from the sheet discharging unit 143 of the printer device 104. A power switch 110 is connected to the controller 103. When the power switch 110 is turned on, power is supplied to a part of a main board 200, which will be described later, of the controller 103 including at least the operation unit 105 and a power control unit 302 to be described later. In addition, the supply of power is not instantly stopped even if the power switch 110 is turned off. That is, the supply of power to components other than a part required to turn on the power switch 110, such as some of the power control unit 302 to be described later, is stopped after waiting for end of software or hardware that is being activated.

In addition, the image forming apparatus 101 is connected to a computer 109 via a LAN 108. The image forming apparatus 101 transmits or receives image data to or from the computer 109 and receives a job from the computer 109, and further, receives an instruction that is given from the computer 109 to the image forming apparatus 101. It should be noted that the number of computers to be connected to the image forming apparatus 101 is not limited to one, and a plurality of computers may be connected.

In the present embodiment, the image forming apparatus 101 has a copy function to record image data read from the scanner device 102 in the HDD 106 and to print the image data using the printer device 104 at the same time. The image forming apparatus 101 has an image transmission function to transmit image data read from the scanner device 102 to the computer 109 via the LAN 108. The image forming apparatus 101 has an image saving function to record image data read from the scanner device 102 in the HDD 106 and to transmit or print the image data if necessary. Further, the image forming apparatus 101 has an image print function to analyze a page description language, for example, which is contained in image data transmitted from the computer 109 and to print the image data using the printer device 104.

Figure 2:
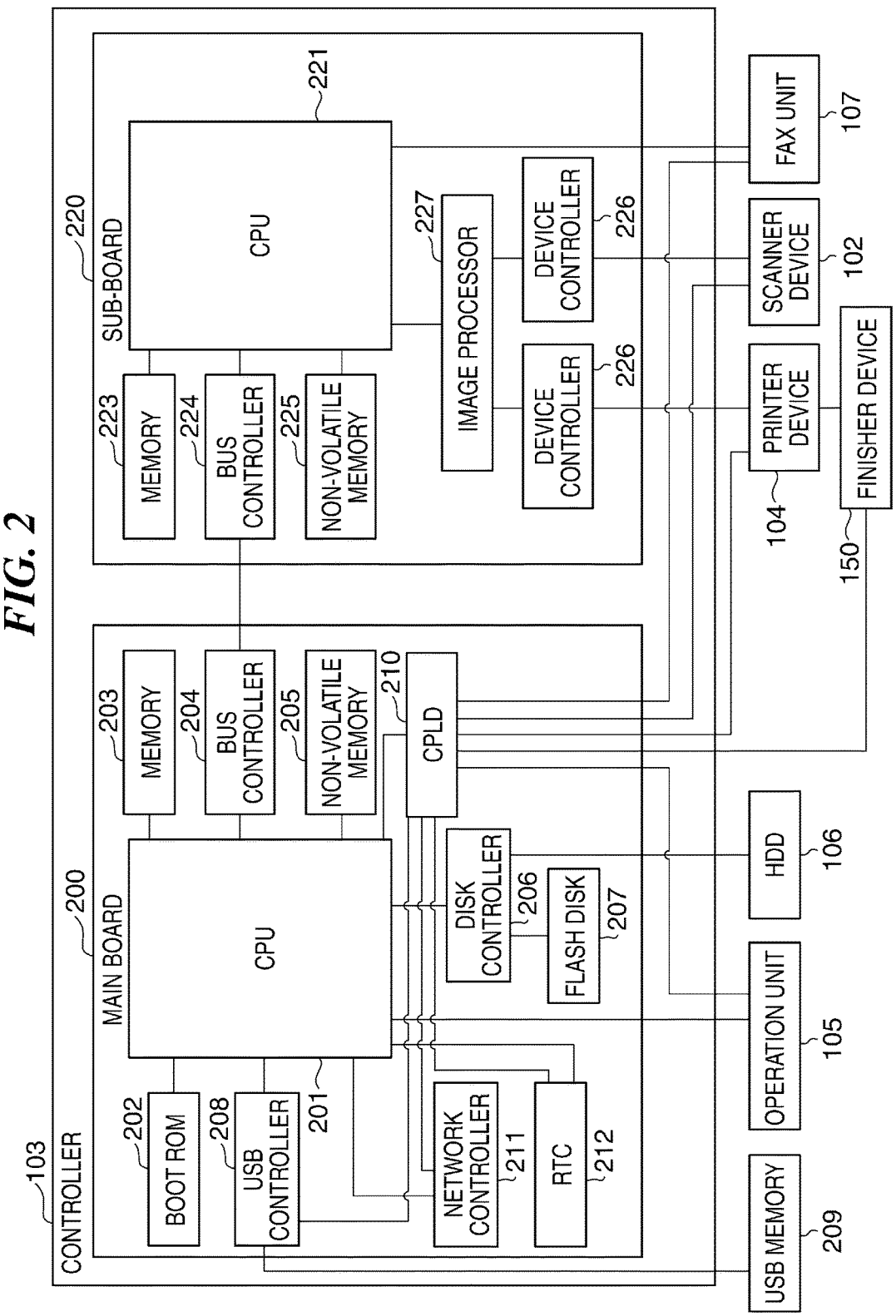
FIG. 2 is a block diagram schematically showing a configuration of a controller and a peripheral apparatus of the image forming apparatus in FIG. 1.

FIG. 2 is a block diagram schematically showing a configuration of the controller 103 and a peripheral apparatus of the image forming apparatus 101 in FIG. 1. As shown in FIG. 2, the controller 103 is configured of the main board 200 and a sub-board 220 to be described later.

The main board 200 is a general-purpose CPU system, and is provided with a CPU 201, a boot ROM 202, a memory 203, a bus controller 204, a non-volatile memory 205, a disk controller 206, and a flash disk 207. The main board 200 is further provided with a USB controller 208, a complex programmable logic device (CPLD) 210, a network controller 211, and a real-time clock (RTC) 212. In addition, the operation unit 105, the HDD 106, a USB memory 209, and the like are connected to the main board 200.

The CPU 201 controls the entire main board 200. A boot program is stored in the boot ROM 202. The memory 203 functions as a work memory of the CPU 201. The bus controller 204 has a bridge function with a bus controller 224, which will be described later, of the sub-board 220. The non-volatile memory 205 is a memory from which data stored therein is not erased even when a power supply of the image forming apparatus 101 is cut off. The disk controller 206 controls a storage device such as the HDD 106 and the flash disk 207. The flash disk 207 is a solid-state drive (SSD) serving as a storage apparatus which is configured using a semiconductor device, for example, and has a relatively small capacity. The USB controller 208 controls the USB memory 209. In addition, the CPU 201 is connected to the CPLD 210 which controls an interrupt signal from each unit or the supply of power to each unit, the network controller 211, the RTC 212, and the USB controller 208. Further, the CPU 201 is connected to the scanner device 102, the printer device 104, the FAX unit 107, and the finisher device 150 via the CPLD 210.

The sub-board 220 is configured of a relatively small CPU system and hardware relating to image processing, and is provided with a CPU 221, a memory 223, the bus controller 224, a non-volatile memory 225, a device controller 226, and an image processor 227. The CPU 221 controls the entire sub-board 220. The memory 223 functions as a work memory of the CPU 221. The bus controller 224 has a bridge function with the bus controller 204 of the main board 200. The non-volatile memory 225 is a memory from which data stored therein is not erased even when a power supply of the image forming apparatus 101 is cut off. The device controller 226 and the image processor 227 perform real-time digital image processing. In addition, the CPU 221 directly controls the FAX unit 107 that is connected to the controller 103.

The scanner device 102 and the printer device 104 receives or transfers image data from or to the sub-board 220 via the device controller 226. It should be noted that the CPU 201 and the CPU 221 include a number of CPU peripheral hardware such as a chipset, a bus bridge, and a clock generator, but the controller 103 of FIG. 2 is simplified in order to facilitate the description. It should be noted that a configuration to which the present invention is applied is not limited to the configuration shown in FIG. 2.

When the user instructs execution of the copy function using the operation unit 105 in the controller 103, the CPU 201 transmits an image read command to the scanner device 102 via the CPU 221. The scanner device 102 having received the image read command creates image data by optically scanning a document and inputs the created image data to the image processor 227 via the device controller 226. The image processor 227 performs direct memory access (DMA) transfer via the CPU 221 so as to temporarily store the image data in the memory 223.

When confirming that a certain amount or the whole of the image data has been saved in the memory 223, the CPU 201 transmits an image output command to the printer device 104 via the CPU 221. Next, the CPU 221 notifies the image processor 227 of an address on the memory 223 at which the image data is saved. Next, the image data saved in the memory 223 is transmitted to the printer device 104 via the image processor 227 and the device controller 226 according to a synchronization signal output from the printer device 104. The printer device 104 prints the received image data onto a sheet. It should be noted that the CPU 201 saves the image data that has been saved in the memory 223 in the HDD 106 in a case of performing printing on a plurality of copies. Accordingly, the printer device 104 can execute printing by receiving the image data from the HDD 106 without intervention of the scanner device 102 at the time of printing the second and subsequent sheets.

Figure 3:
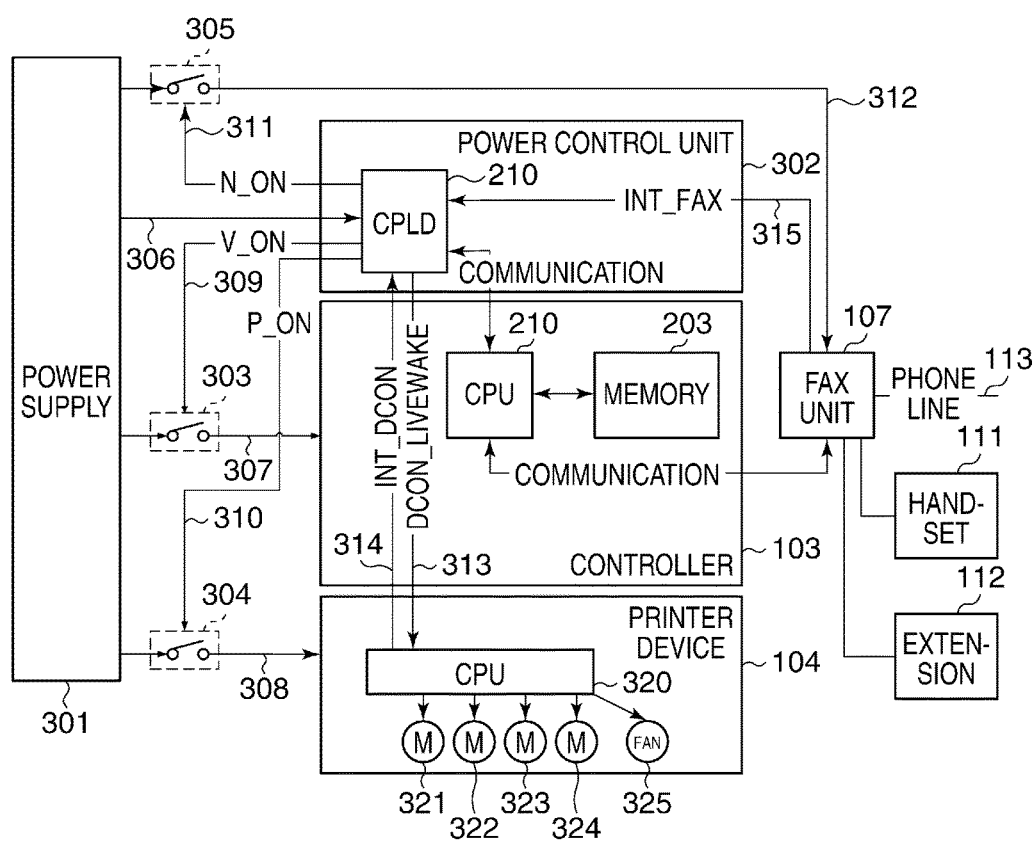
FIG. 3 is a diagram for describing a power supply configuration of the image forming apparatus in FIG. 1.

FIG. 3 is a diagram for describing a power supply configuration of the image forming apparatus 101 in FIG. 1.

The image forming apparatus 101 is provided with the controller 103, a power supply 301, and the power control unit 302 as main components of the power supply configuration. Power is continuously supplied from the power supply 301 to the power control unit 302 via a power supply line 306 which is a continuous power supply line. Accordingly, the power control unit 302 is energized even in a shut-down state of the image forming apparatus 101. In addition, power is supplied from the power supply 301 to the controller 103 via a power supply line 307 which is a non-continuous power supply line, and power is supplied from the power supply 301 to the printer device 104 via a power supply line 308 which is a non-continuous power supply line. Further, power is supplied from the power supply 301 to the FAX unit 107 via a power supply line 312 which is a continuous power supply line. The power control unit 302 includes the CPLD 210, and the CPLD 210 is programmed in advance so as to execute the following processing in accordance with the supply of power. That is, the CPLD 210 switches a connection state of a relay switch 303 provided in the power supply line 307 by outputting a first power control IO signal V_ON 309. Accordingly, the supply of power, which is performed from the power supply 301 to the controller 103 via the power supply line 307, is controlled.

The CPLD 210 performs communication with the CPU 201 and executes processing set by the CPU 201 when a built-in timer (not shown) is activated based on a plurality of timer values set in the communication. In addition, the CPLD 210 switches a state of a relay switch 304 provided in the power supply line 308 by outputting a second power control IO signal P_ON 310. Accordingly, the supply of power, which is performed from the power supply 301 to the printer device 104 via the power supply line 308, is controlled.

Further, the CPLD 210 outputs a predetermined IO signal based on an instruction from the CPU 201. The predetermined IO signal is, for example, a DCON_LIVEWAKE signal 313 between the CPLD 210 and the printer device 104. When power is supplied to the printer device 104 in a state where the DCON_LIVEWAKE signal 313 has been asserted, the printer device 104 quietly returns without performing a specific operation that may consume power. The printer device 104 notifies the CPLD 210 of a fact indicating its return by outputting an INT_DCON signal 314. It should be noted that examples of the specific operation include each rotation operation of a motor, a roller, a polygon mirror, and the like of the printer device 104, temperature control of drums 321 to 324, a heat dissipation process in which a fan 325 is used, and the like.

The CPLD 210 switches a state of a relay switch 305 provided in the power supply line 312 by outputting a third power control IO signal N_ON 311. Accordingly, the supply of power, which is performed from the power supply 301 to the FAX unit 107 via the power supply line 312, is controlled. It should be noted that power is supplied to the FAX unit 107 in a sleep state as well as a normal state. When there is an incoming call from an outside via the phone line 113 in the sleep state, the FAX unit 107 that has received the incoming call outputs an INT_FAX signal 315 to notify the CPLD 210 of the incoming call or detection of off-hook. Accordingly, the CPLD 210 is notified of the presence of the incoming call, and thus, it is possible to return the image forming apparatus 101 from the sleep state in response to the incoming call. Further, when the handset 111 and the extension 112 connected to the FAX unit 107 are off-hooked, the FAX unit 107, which has detected the off-hook, outputs the INT_FAX signal 315 to the CPLD 210. Accordingly, the CPLD 210 is notified of the detection of the off-hook, and thus, it is possible to return the image forming apparatus 101 from the sleep state in response to the off-hook. It should be noted that power is not supplied to the power supply line 312 in the shut-down state.

It should be noted that the power supply control to each block shown in FIG. 3, for example, the power control unit 302, the controller 103, the printer device 104, and the FAX unit 107 may be performed using two-system relay switches, for example. In this case, only one relay switch connected to a block to which power is not supplied is turned off and the other relay switch is turned on in the sleep state, and both the two-system relay switches are turned off in the shut-down state. In the case of using the two-system relay switches, multi-level control signals are used instead of binary control signals for the power supply control depending on an energization state. In addition, power is supplied to the scanner device 102 in the same manner as the printer device 104, the description thereof will be omitted herein. Further, although a power supply control signal and a power supply line with respect to the scanner device 102 are not shown in FIG. 3, the scanner device 102 may share the power supply control signal and the power supply line with the printer device 104.

Next, a description will be given regarding supply of power during activation, the normal state, execution of the image print function, the transition to the sleep state, the sleep state, and the return from the sleep state of the image forming apparatus 101.

First, the supply of power during the activation of the image forming apparatus 101 will be described. When use of the image forming apparatus 101 is started, a user first turns on the power switch 110. When receiving the turning-on of the power switch 110, the power supply 301 notifies the CPLD 210 of the turning-on of the power supply via the power supply line 306. When being notified of the turning-on of the power supply, the CPLD 210 switches on the relay switches 303 and 304 by outputting the first power control IO signal V_ON 309 and the second power control IO signal P_ON 310. Accordingly, power is supplied from the power supply 301 to the entire image forming apparatus 101.

In this manner, the power control unit 302 performs the supply of power to the entire image forming apparatus 101, to be more specific, to the controller 103, the printer device 104, and the scanner device 102 via the respective power supply lines during the activation. In response to this, each CPU of the printer device 104 and the scanner device 102 performs initialization during the activation. When power is supplied from the power supply 301, the CPU 201 of the controller 103 first performs initialization of each hardware, for example, initialization of a register, initialization of an interrupt signal, registration of a device driver at the time of kernel activation, initialization of the operation unit 105, and the like. Next, the CPU 201 performs initialization of software, for example, calling of an initialization routine of each library, activation of a process and a thread, activation of a software service that performs communication with the printer device 104 and the scanner device 102, drawing of the operation unit 105, and the like. When the initialization processes are ended, the image forming apparatus 101 is transitioned to the standby state.

Next, the supply of power during the normal state of the image forming apparatus 101 will be described. Not only the supply of power with respect to the entire unit of the image forming apparatus 101 but also the supply of power with respect to the printer device 104 and the scanner device 102 are performed in the normal state. However, power is not supplied to the printer device 104 when a printing process is not executed. In addition, the supply of power with respect to each unit of the printer device 104 is restricted such that a motor used for printing or the polygon mirror is not operated even if power is supplied to the printer device 104 in a case of an operation standby state of the printer device 104. Further, power is not supplied to the scanner device 102 when the LCD touch panel 500 of the operation unit 105 is not turned on and it is known that a user is not present in front of the image forming apparatus 101. In addition, the supply of power with respect to each unit is restricted such that a home position detection unit, configured for reading an image, is not operated even if power is supplied to the scanner device 102 in a case of an operation standby state of the scanner device 102.

Next, the supply of power during the execution of the image print function of the image forming apparatus 101 will be described. When receiving image data from the computer 109 via the LAN 108, the CPU 201 analyzes the received image data and creates a print job. When the CPU 201 notifies the CPLD 210 of the execution of the image print function, the CPLD 210 switches on the relay switch 304 by outputting the second power control IO signal P_ON 310. Accordingly, power is supplied to the printer device 104 from the power supply 301 via the power supply line 308. When power is supplied to the printer device 104, the CPU 201 executes the created print job. Here, the CPU 201 transmits the image data to the memory 203, the bus controller 224, and the CPU 221 and transmits the image data to the printer device 104 via the image processor 227 and the device controller 226. The printer device 104 executes printing based on the received image data, and notifies the CPU 201 of a result thereof when the printing is completed. When being notified of the result from the printer device 104, the CPU 201 notifies the CPLD 210 of the reception of notification, and the CPLD 210 switches off the relay switch 304 by outputting the second power control IO signal P_ON 310. Accordingly, the supply of power to the printer device 104 is cut off.

Subsequently, the supply of power during the transition to the sleep state of the controller 103 will be described. When the user does not use the image forming apparatus 101 and the standby state is continued for a certain period of time, the CPU 201 of the controller 103 is transitioned to the sleep state. It should be noted that, in the present embodiment, the sleep state represents a state where it is possible to shorten a start-up time than that of a case of a normal activation while suppressing an amount of power consumption of the image forming apparatus 101. Here, the CPU 201 notifies the CPLD 210 of the power control unit 302 of the transition to the sleep state, and the CPLD 210 controls the supply of power from the power supply 301 to the controller 103.

Figure 4:
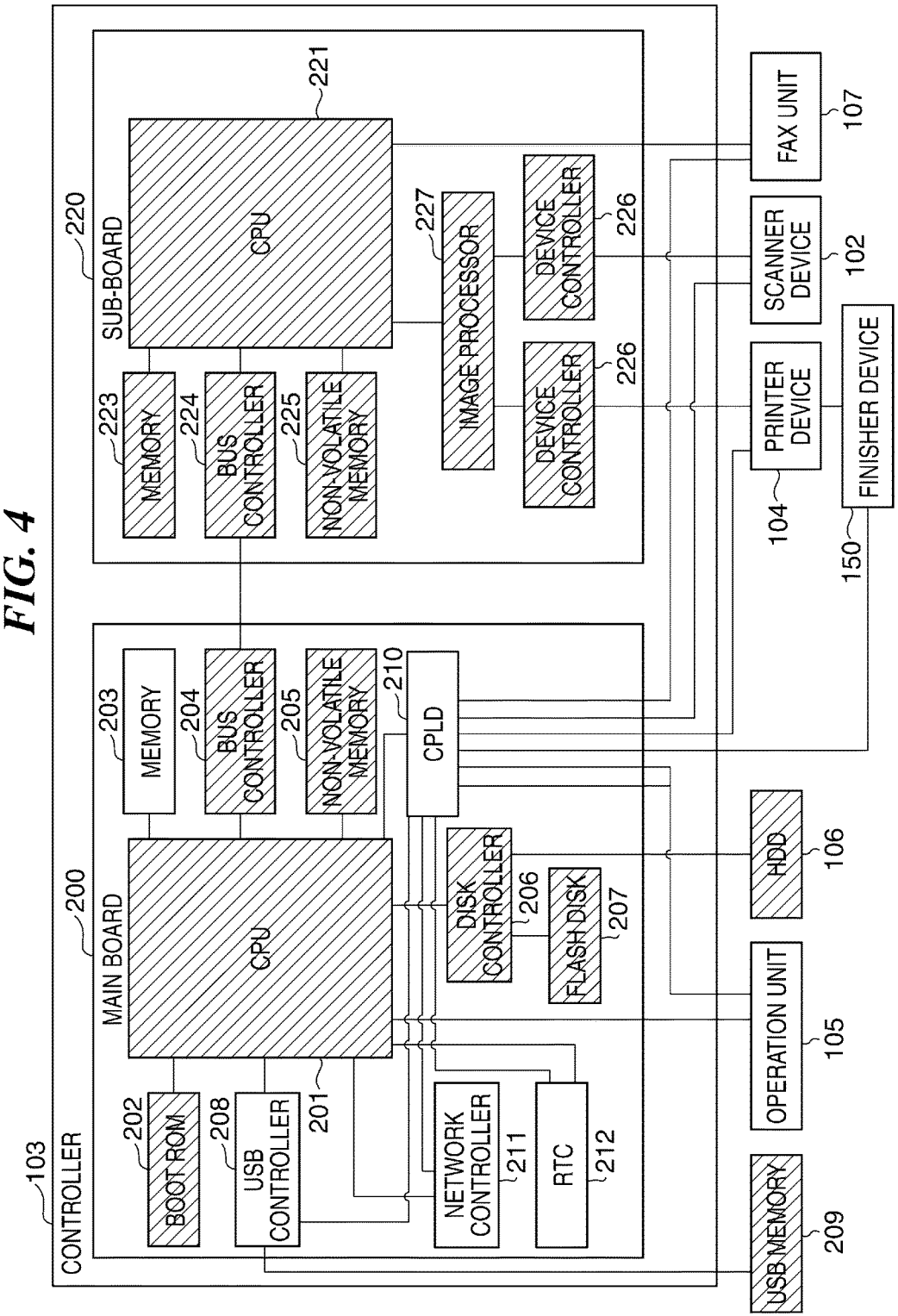
FIG. 4 is a diagram for describing supply of power in a sleep state of the controller in FIG. 2.

Next, the supply of power during the sleep state of the controller 103 will be described. FIG. 4 is a diagram for describing the supply of power in the sleep state of the controller 103. In FIG. 4, components to which power is not supplied are shown with hatching.

First, the image forming apparatus 101 is transitioned to the sleep state when a certain period of time has elapsed without the user's operation with respect to the image forming apparatus 101 in the standby state, when the user presses a power saving key 509 (see FIG. 5) on the operation unit 105 or when a timing set in advance has come. In the sleep state, power is supplied to the CPLD 210, the memory 203, and the like of the main board 200 on the controller 103. In addition, power is also supplied to the USB controller 208, the network controller 211 and the RTC 212 of the main board 200, the power saving key 509, which will be described later, of the operation unit 105, and an incoming call detection unit of the FAX unit 107. Further, power is also supplied to some of various sensors and the like of the printer device 104, the scanner device 102 and the finisher device 150. Examples of the various sensors include sensors each of which performs opening of a door cover, opening of a toner cover, and detection of manual sheet tray of the printer device 104, opening of a pressure plate of the scanner device 102, and detection of a feeder document. It should be noted that power is supplied to each control unit of the handset 111 and the extension 112 although not shown.

Subsequently, the supply of power during the return of the controller 103 from the sleep state will be described. In the sleep state, the CPLD 210 starts the supply of power when receiving one or more interrupt signals (hereinafter, referred to as "sleep return factors") from a network incoming call, the RTC, the FAX unit 107 which detects a phone incoming call, a FAX incoming call and the off-hook, the power saving key 509, the various sensors, the USB, and the like. The CPLD 210 notifies the CPU 201 of the reception of the sleep return factor, and the CPU 201 having received the notification performs a process of returning a state of power supply and a state of software to the normal state from the sleep state, that is, a sleep return process. For example, when the pressing of the power saving key 509 is detected, the CPLD 210 first returns the CPU 201 from the sleep state in response to the pressing of the power saving key 509. When having returned from the sleep state, the CPU 201 notifies the CPLD 210 of the return from the sleep state. The CPLD 210 having received the notification switches on the relay switches 303 and 304 by outputting the first power control IO signal V_ON 309 and the second power control IO signal P_ON 310. Accordingly, power is supplied from the power supply 301 to the controller 103, the printer device 104, and the scanner device 102 via the respective power supply lines. Here, the CPU 201 is transitioned to the sleep state again when the print job, for example, is ended. At this time, the CPU 201 notifies the CPLD 210 of the transition to the sleep state. The CPLD 210 having received the notification switches off the relay switch 304 by outputting the second power control IO signal P_ON 310. Accordingly, the power supply 301 stops the supply of power to components except for the controller 103.

In addition, when receiving the network incoming call, for example, the CPLD 210 switches on the relay switch 303 by outputting the first power control IO signal V_ON 309 in response to the network incoming call. Accordingly, power is supplied from the power supply 301 to the controller 103, and thus, the CPU 201 returns from the sleep state. It should be noted that the printer device 104 and the scanner device 102 may not supply power when the print job is not created or when it is unnecessary to acquire device information. In addition, the sleep return factor is not limited to the above-described examples, and further, the power supply state during the sleep state is not limited to the above-described examples.

Figure 5:
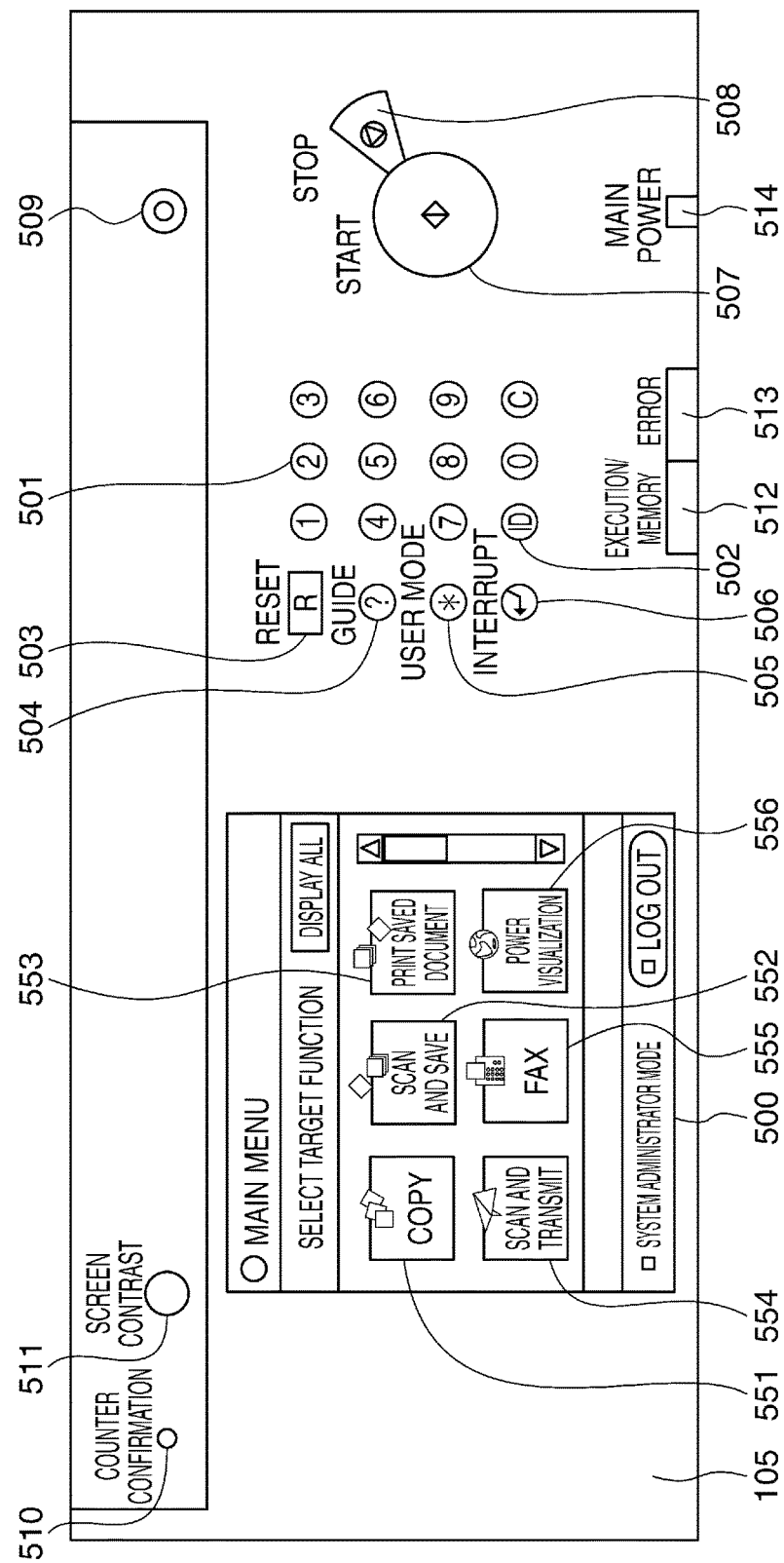
FIG. 5 is a diagram showing a configuration of an operation unit of the image forming apparatus in FIG. 1.

FIG. 5 is a diagram showing a configuration of the operation unit 105 of the image forming apparatus 101 shown in FIG. 1.

The operation unit 105 is provided with the LCD touch panel 500, a numeric keypad 501, an ID key 502, a reset key 503, a guide key 504, a user mode key 505, an interrupt key 506, a start key 507, a stop key 508, and the power saving key 509. In addition, the operation unit 105 is provided with a counter confirmation key 510, a screen contrast key 511, a job LED 512, an error LED 513, and a power LED 514. Further, the operation unit 105 functions as a user I/F which is configured to operate the image forming apparatus 101.

The numeric keypad 501 is used at the time of inputting numeric values of 0 to 9. The ID key 502 is used at the time of inputting a division number and a security code when divisional management of a user has been set in the image forming apparatus 101. The reset key 503 is used at the time of resetting a set mode. The guide key 504 is used at the time of displaying a description screen for each mode on the LCD touch panel 500. The user mode key 505 is used at the time of calling a user mode screen. The interrupt key 506 is used at the time of performing interrupt copy. The start key 507 is used at the time of starting a copy operation, and the stop key 508 is used to stop a job that is being executed. The power saving key 509 is used to turn off the LCD touch panel 500 and causes the image forming apparatus 101 to be transitioned to the sleep state or to turn on the LCD touch panel 500 and return the image forming apparatus 101 from the sleep state. The counter confirmation key 510 is used at the time of displaying a count screen, which displays a total of used sheets, on the LCD touch panel 500. The screen contrast key 511 is used at the time of adjusting contrast of the LCD touch panel 500. The job LED 512 indicates that the print job is being executed or that image data is being stored in the memory. The error LED 513 indicates an error state such as jam and door open of the image forming apparatus 101. The power LED 514 indicates an on-state or an off-state of the power switch 110.

Various keys 551 to 556 are displayed on the LCD touch panel 500, and the various keys 551 to 556 are used at the time of executing each function of the image forming apparatus 101. For example, a copy screen is displayed when the "copy" key 551 is pressed, and a screen for saving an image scanned by the scanner device 102 in the HDD 106 is displayed when the "scan and save" key 552 is pressed. In addition, a print screen for printing the image data saved in the HDD 106 using the printer device 104 is displayed when the "print saved document" key 553 is pressed. A screen for transmitting the image scanned by the scanner device 102 to an external apparatus such as the computer 109 via the LAN 108 is displayed when the "scan and transmit" key 554 is pressed. Further, a FAX screen for printing the data received by the FAX unit 107 via the phone line 113 using the printer device 104 is displayed when the "FAX" key 555 is pressed. Alternatively, a FAX screen for transmitting the image scanned by the scanner device 102 from the FAX unit 107 to the phone line 113 is displayed when the "FAX" key 555 is pressed. A screen for confirming the power state of the image forming apparatus 101 is displayed when the "power visualization" key 556 is pressed.

It should be noted that the functions corresponding to the various keys 551 to 556 are examples of functions provided in the image forming apparatus 101, and other functions can be displayed by scrolling a scroll bar to be displayed at the right side on the LCD touch panel 500.

Figure 6:
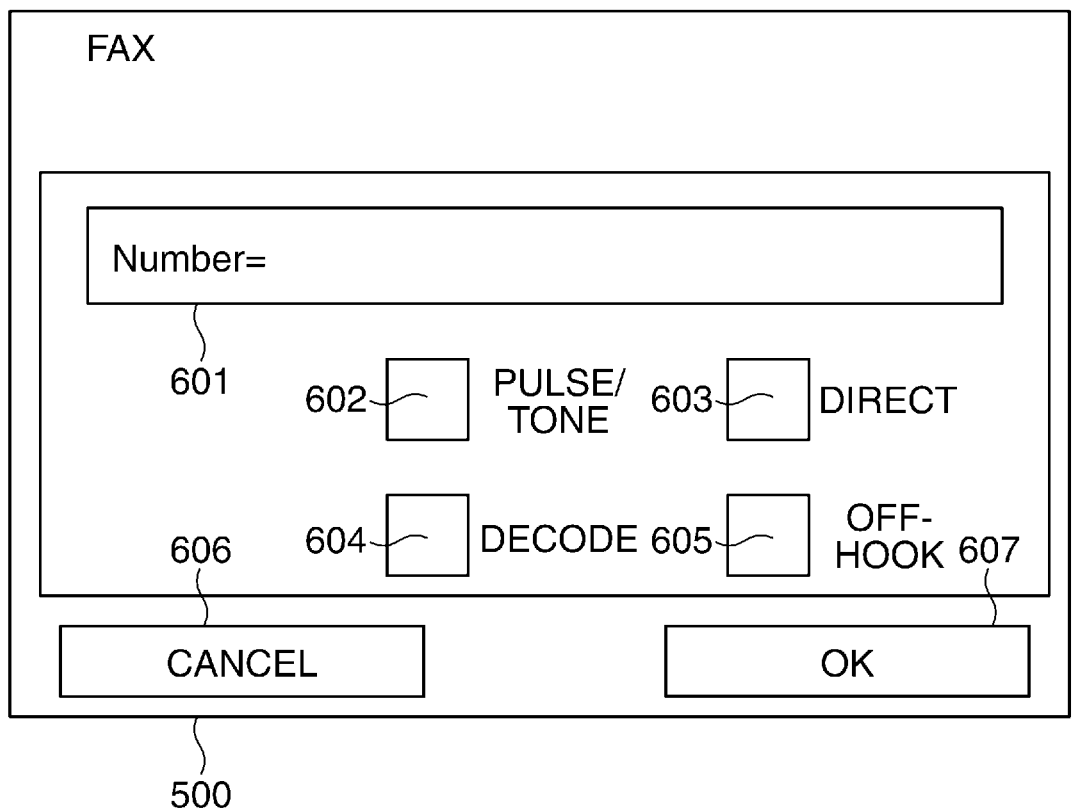
FIG. 6 is a diagram for describing a destination number input screen which is displayed on an LCD touch panel shown in FIG. 5.

FIG. 6 is a diagram for describing a FAX screen (destination number input screen) which is displayed on the LCD touch panel 500 shown in FIG. 5. This screen is displayed when the "FAX" key 555 is pressed in the LCD touch panel 500. In addition, a destination number input field 601 for inputting a destination number of a phone or a FAX and a pulse/tone key 602 for switching setting between a pulse line and a tone line are displayed on this screen. Further, a direct key 603 for selecting whether or not to perform direct transmission to start reading of a document after establishment of line connection and a decode key 604 for selecting whether or not to decode a digitally encoded signal are displayed on this screen. In addition, the off-hook key 605 for turning the image forming apparatus 101 into an off-hook state without off-hooking the handset 111 and the extension 112, a cancel key 606, for cancelling each operation, and an OK key 607 for confirming execution of each operation are displayed on this screen.

Hereinafter, a description will be given regarding the sleep return process which is executed when the image forming apparatus 101 is in the sleep state.

Figure 7:
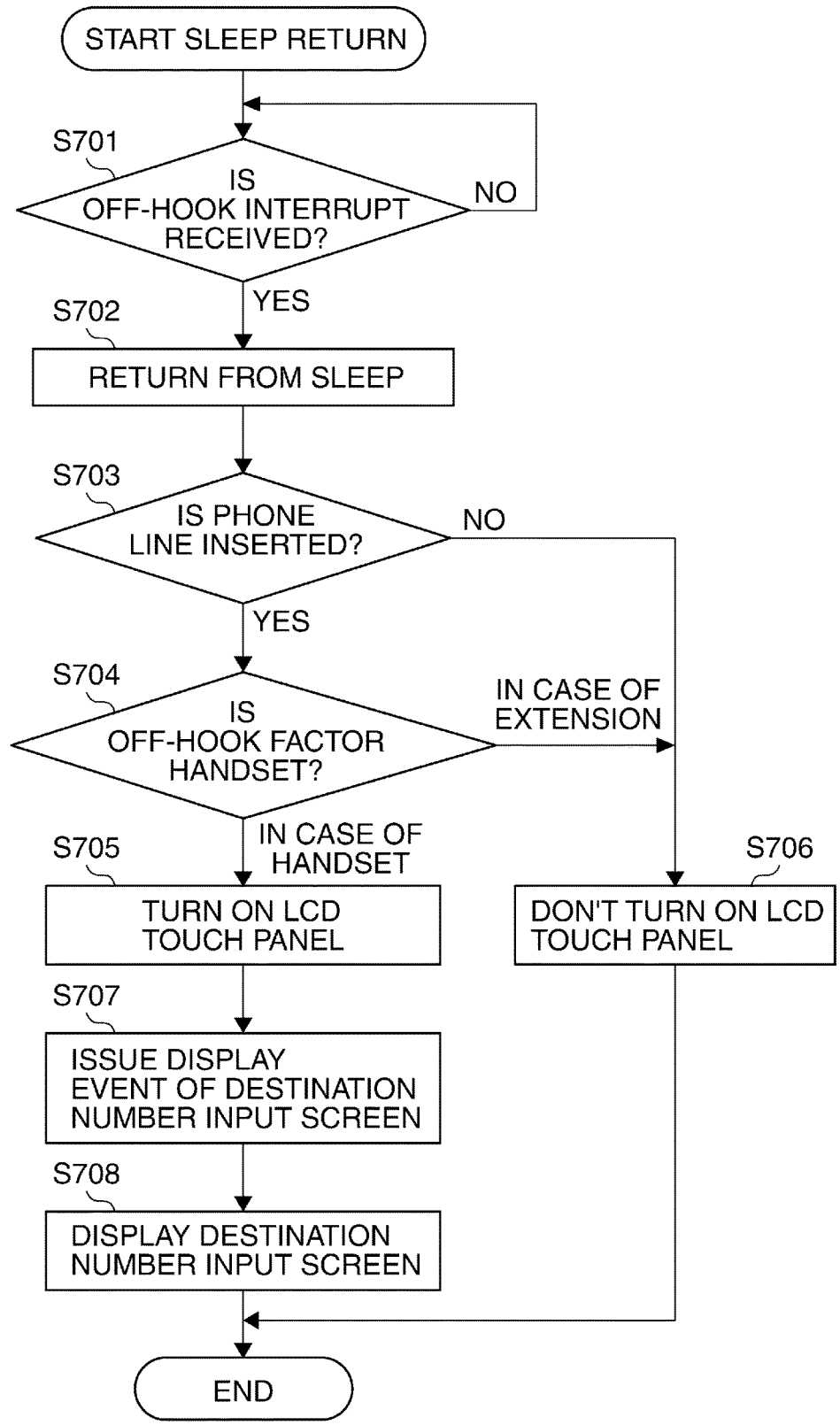
FIG. 7 is a flowchart showing a procedure of a sleep return process as a control method for the information processing apparatus according to the first embodiment of the present invention.

FIG. 7 is a flowchart showing a procedure of the sleep return process as a control method for the information processing apparatus according to the first embodiment. The process of FIG. 7 is executed when the image forming apparatus 101 is in the sleep state.

First, the CPLD 210 determines whether the INT_FAX signal 315 (hereinafter, referred to as "off-hook interrupt"), which is output due do off-hook, is received from the FAX unit 107 (step S701). When determining that the off-hook interrupt is received, the CPLD 210 switches on the relay switch 303 by outputting the first power control IO signal V_ON 309. Accordingly, power is supplied from the power supply 301, and the CPU 201 returns from the sleep state (step S702). On the other hand, when determining that off-hook interrupt is not received, the CPLD 210 stands by until receiving the off-hook interrupt.

Next, the CPU 201 determines whether the phone line 113 is inserted in (connected to) the FAX unit 107 (step S703). In the step S703, the CPU 201 inquires the FAX unit 107 of whether the phone line 113 is inserted therein, and in response to this, the FAX unit 107 replies to the CPU 201 with a connection state of the phone line 113. It should be noted that whether the phone line 113 is inserted in the FAX unit 107 is determined by the FAX unit 107 confirming a line voltage of the phone line 113 and detecting the line voltage. When determining that the phone line 113 is inserted in the FAX unit 107 in step S703, the CPU 201 determines whether a factor of the off-hook interrupt (hereinafter, referred to as an "off-hook factor") received in the step S701 is the off-hook of the handset 111 or the off-hook of the extension 112 (step S704). On the other hand, when determining that the phone line 113 is not inserted in the FAX unit 107 (non-connection) in the step S703, the CPU 201 causes the process to proceed to step S706.

In the step S704, the CPU 201 inquires the FAX unit 107 of whether the off-hook factor is the off-hook of the handset 111 or the off-hook of the extension 112. The FAX unit 107 determines each hook state of the handset 111 and the extension 112 based on each voltage which is applied to the handset 111 and the extension 112. The FAX unit 107 notifies the CPU 201 of whether the off-hook factor is the off-hook of the handset 111 or the off-hook of the extension 112 based on a result of the determination. It should be noted that each hook state of the handset 111 and the extension 112 can be always detected during the operation of the FAX unit 107. Here, when it is determined that the off-hook factor is the off-hook of the handset 111, the CPU 201 is transitioned from the sleep state to the standby state and turns on the LCD touch panel 500 (step S705) (the display control unit). On the other hand, when it is determined that the off-hook factor is the off-hook of the extension 112 in the step S704, the CPU 201 causes the process to proceed to the step S706. In the step S706, the CPU 201 maintains the sleep state without being transitioned to the standby state, and ends the present process without turning on the LCD touch panel 500.

When turning on the LCD touch panel 500 in step S705, the CPU 201 issues a display event of the destination number input screen (FIG. 6) for allowing the user to input the destination number of FAX transmission destination (step S707). Thereafter, the CPU 201 displays the destination number input screen on the LCD touch panel 500 (step S708), and ends the present process.

It should be noted that the process of FIG. 7 has been described regarding the case where the display event of the destination number input screen is issued after the LCD touch panel 500 is turned on, and in this case, there is a possibility that the screen of the LCD touch panel 500 flickers. Accordingly, in the sleep return process, the LCD touch panel 500 may be turned on after the display event of the destination number input screen is issued.

According to the sleep return process of FIG. 7, the LCD touch panel 500 is turned on when the phone line 113 is inserted in the FAX unit 107 and it is determined that the off-hook interrupt whose factor is the off-hook of the handset 111 is received. On the contrary, the LCD touch panel 500 is not turned on when the phone line 113 is not inserted in the FAX unit 107 even if it is determined that the off-hook interrupt is received. Accordingly, the user who has performed the off-hook of the handset 111 can know a status where it is difficult to use the call function and the FAX function since the phone line 113 is not inserted in the FAX unit 107 based on a lightening status of the LCD touch panel 500. Accordingly, it is possible to prevent the user who has performed the off-hook of the handset 111 from inputting the phone number of communication destination to the LCD touch panel 500 even in the state where it is difficult to use the call function and the FAX function. As a result, it is possible to prevent the user from unnecessarily taking a wasteful action.

In addition, it is difficult to use the call function and the FAX function when the phone line 113 is not inserted in the FAX unit 107. Accordingly, it is meaningless to turn on the LCD touch panel 500 for allowing the user to input the phone number of the communication destination, and wasteful power is consumed due to lightening of the LCD touch panel 500. In regard to this, the LCD touch panel 500 is not turned on in the sleep return process of FIG. 7 when the phone line 113 is not inserted in the FAX unit 107. Accordingly, it is possible to effectively reduce power consumption without impairing convenience of the user.

Further, the LCD touch panel 500 is not turned on in the sleep return process of FIG. 7 when the off-hook factor is the off-hook of the extension 112. The extension 112 includes a number input unit and a display unit in its main body, and the user does not need to input the phone number of the communication destination to the LCD touch panel 500 when the user has performed the off-hook of the extension 112. Accordingly, it is unnecessary to turn on the LCD touch panel 500 of the image forming apparatus 101 to input the phone number of the communication destination, and it is possible to avoid consumption of power due to lightening of the LCD touch panel 500. That is, it is possible to effectively reduce power consumption without impairing convenience of the user.

Next, a description will be given regarding a control method for an information processing apparatus according to a second embodiment of the present invention. The present embodiment is basically the same as the above-described first embodiment in terms of its configuration and effect, and thus, redundant configuration and effect thereof will not be described, and different configuration and effect will be described hereinafter.

Figure 8:
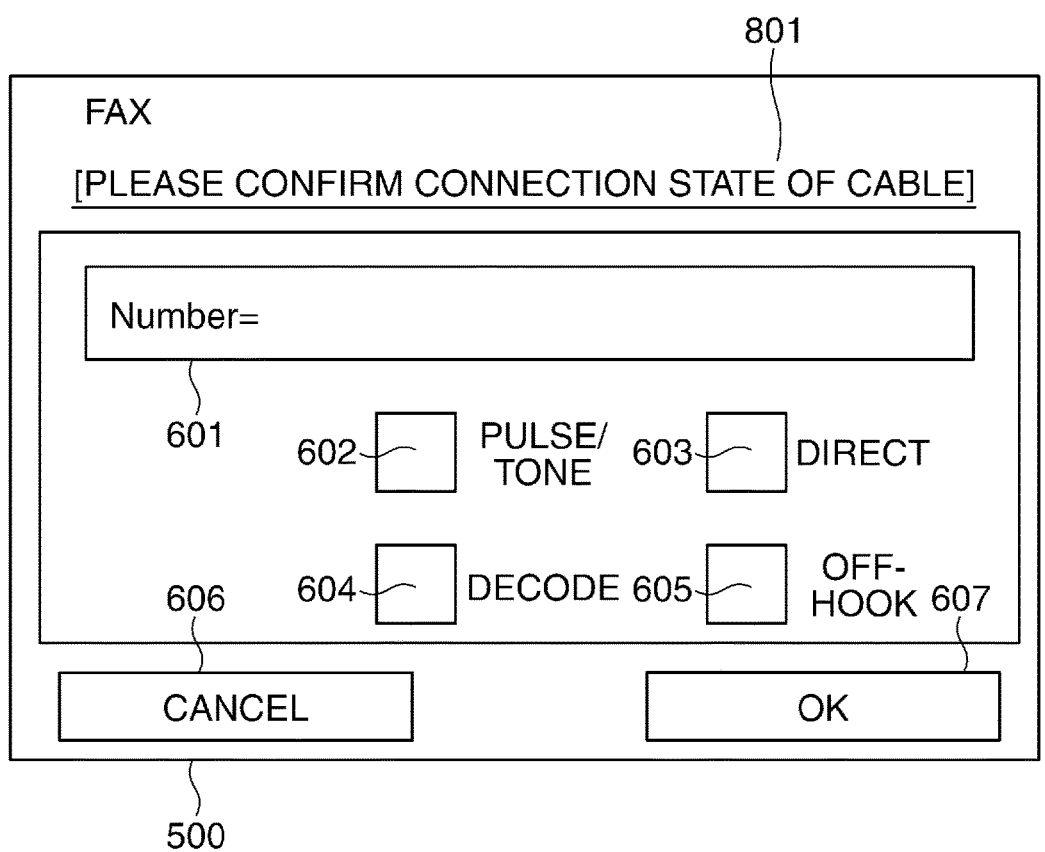
FIG. 8 is a diagram showing a destination number input screen which is displayed on an LCD touch panel in a sleep return process as a control method for an information processing apparatus according to a second embodiment of the present invention.

FIG. 8 is a diagram showing a destination number input screen which is displayed on an LCD touch panel in a sleep return process as the control method for the information processing apparatus according to the second embodiment of the present invention.

In the present embodiment, the destination number input screen is displayed on the LCD touch panel 500 when the "FAX" key 555 is pressed or when the handset 111 or the extension 112 is off-hooked. The destination number input screen includes a status field 801 which displays a status of the image forming apparatus 101 at the time of executing the call function and the FAX function. Here, when the phone line 113 is not inserted in the FAX unit 107, the user is not able to make a call and transmit a FAX even if inputting the destination number to the destination number input field 601 on the destination number input screen. Accordingly, the use is notified of the status where the phone line 113 is not inserted in the FAX unit 107 using the status field 801 by displaying a character string (message), for example, "please confirm connection state of cable".

Figure 9:
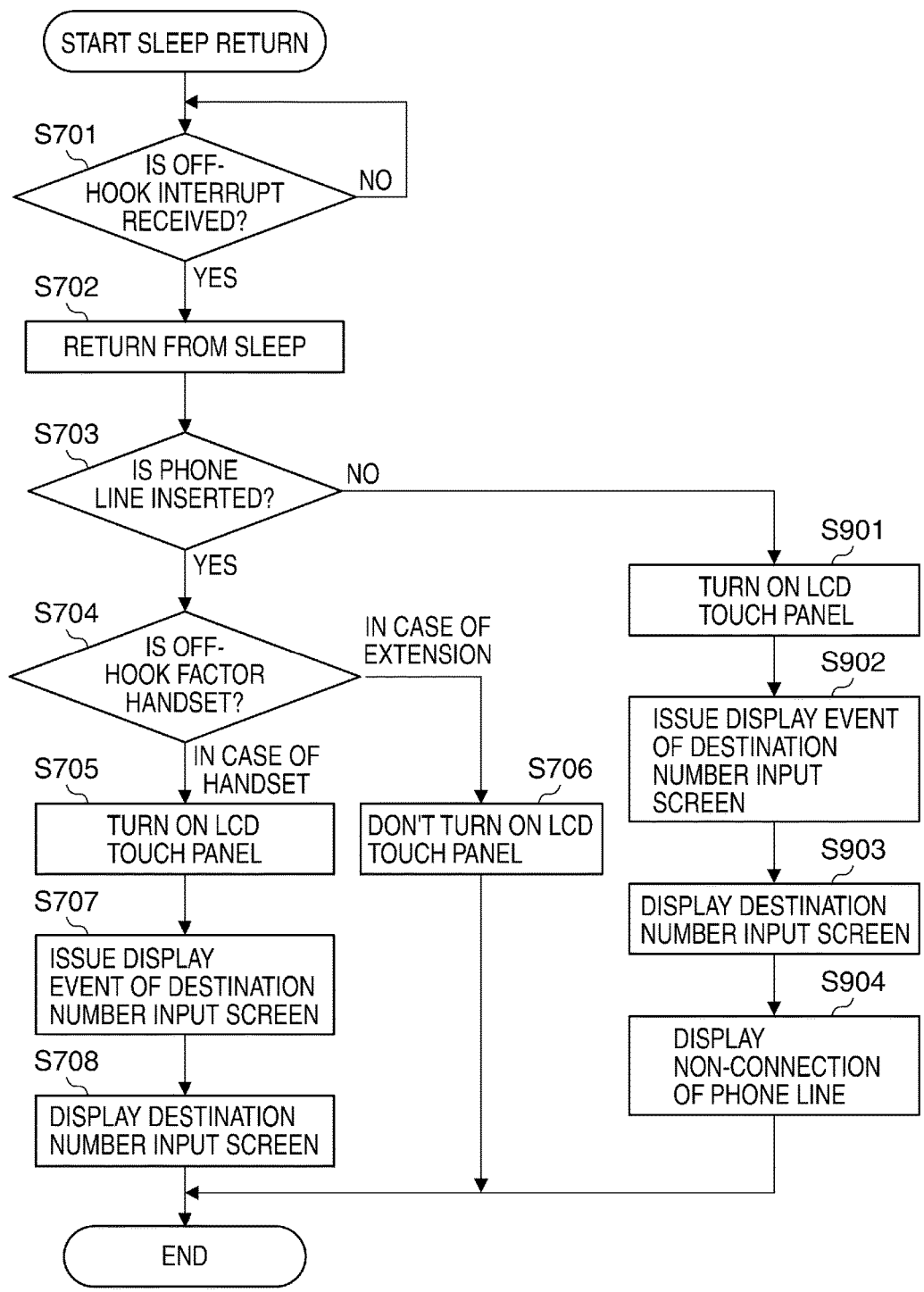
FIG. 9 is a flowchart showing a procedure of the sleep return process as the control method for the information processing apparatus according to the second embodiment of the present invention.

FIG. 9 is a flowchart showing a procedure of the sleep return process as the control method for the information processing apparatus according to the second embodiment of the present invention.

In FIG. 9, when it is determined that the phone line 113 is not inserted in the FAX unit 107 in step S703 after execution of steps S701 and S702, the image forming apparatus 101 is transitioned from the sleep state to the standby state. Thereafter, the LCD touch panel 500 is turned on (step S901). Next, the CPU 201 issues a display event of the destination number input screen (FIG. 8) (step S902) and displays the destination number input screen on the LCD touch panel 500 (step S903). Thereafter, the CPU 201 displays the message on the status field 801 of the destination number input screen to notify the user of the status where the phone line 113 is not inserted in the FAX unit 107 (step S904) and ends the present process.

When the phone line 113 is not inserted in the FAX unit 107, the message indicating the fact is displayed on the LCD touch panel 500 according to the process of FIG. 9. Accordingly, the user can easily grasp that the phone line 113 is not connected to the image forming apparatus 101, and it is unavailable to use the call function and the FAX function. As a result, it is possible to reliably prevent the user from taking the wasteful action.

Next, a description will be given regarding a control method for an information processing apparatus according to a third embodiment of the present invention. The present embodiment is basically the same as the above-described first embodiment in terms of its configuration and effect, and thus, redundant configuration and effect thereof will not be described, and different configuration and effect will be described hereinafter.

Figure 10:
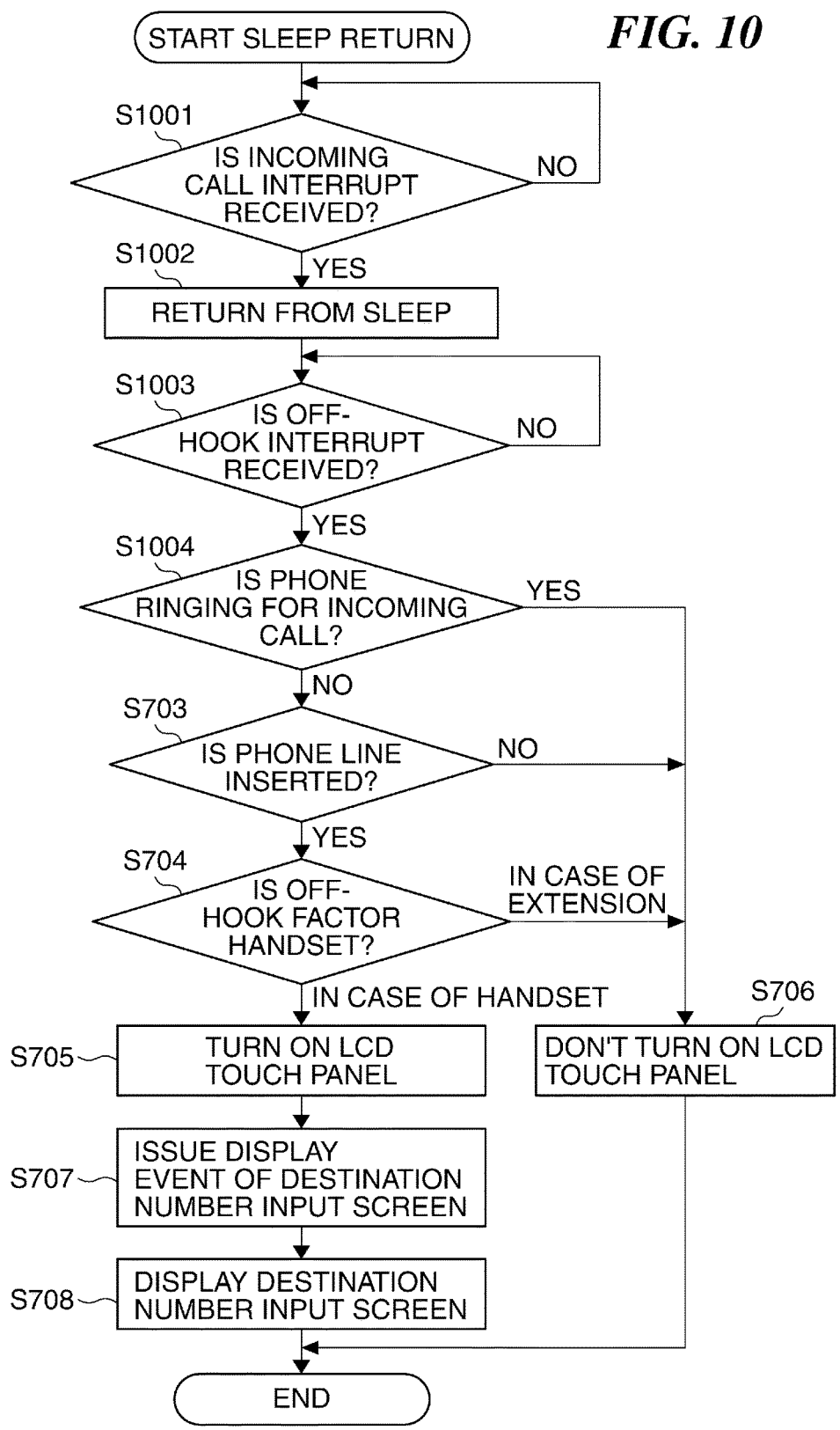
FIG. 10 is a flowchart showing a procedure of a sleep return process as a control method for an information processing apparatus according to a third embodiment of the present invention.

FIG. 10 is a flowchart showing a procedure of the sleep return process as the control method for the information processing apparatus according to the third embodiment of the present invention.

In FIG. 10, the CPLD 210 determines whether any incoming call interrupt of a phone incoming call and a FAX incoming call that is received from the FAX unit 107 (step S1001) (an incoming call reception unit). When determining that the incoming call interrupt us received, the CPLD 210 returns the CPU 201 from the sleep state (step S1002). Next, the CPU 201 having returned from the sleep state determines whether the off-hook interrupt is received (step S1003). When determining that the off-hook interrupt is received in the step S1003, the CPU 201 determines whether the phone incoming call is being received (step S1004). When it is determined that the phone incoming call is being received in the step S1004 (YES in the step S1004), the CPLD 210 causes the process to proceed to step S706. On the other hand, when it is determined that the phone incoming call is not being received in the step S1004, that is, when the FAX incoming call is being received, the CPLD 210 causes the process to proceed to the step S703, and executes the process of the step S703 and the subsequent steps.

According to the sleep return process of FIG. 10, the LCD touch panel 500 is not turned on when the phone incoming call is being received even if it is determined that the off-hook interrupt is received. When the user performs the off-hook during the phone incoming call, the user only receives the call, and the user does not perform an out-going action toward the communication destination. Accordingly, it is unnecessary to turn on the LCD touch panel 500 to input the phone number of the communication destination, and it is possible to avoid consumption of power due to lightening of the LCD touch panel 500. That is, it is possible to effectively reduce power consumption without impairing convenience of the user.

Next, a description will be given regarding a control method for an information processing apparatus according to a fourth embodiment of the present invention. The present embodiment is basically the same as the above-described first embodiment in terms of its configuration and effect, and thus, redundant configuration and effect thereof will not be described, and different configuration and effect will be described hereinafter.

Figure 11:
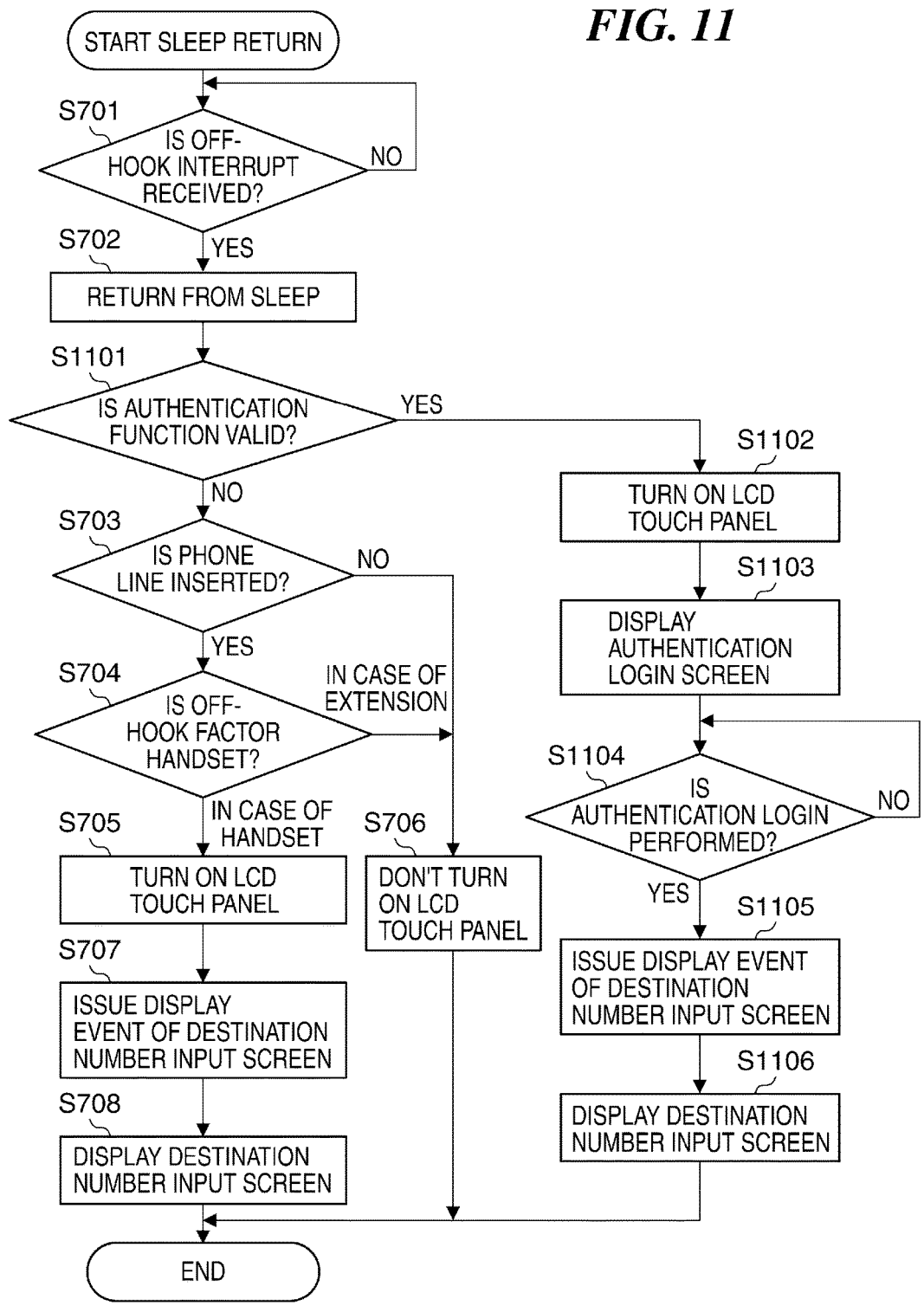
FIG. 11 is a flowchart showing a procedure of a sleep return process as a control method for an information processing apparatus according to a fourth embodiment of the present invention.

FIG. 11 is a flowchart showing a procedure of the sleep return process as the control method for the information processing apparatus according to the fourth embodiment of the present invention.

In FIG. 11, when the image forming apparatus 101 returns from the sleep state in step S702 after execution of step S701, the CPU 201 determines whether an authentication function of the image forming apparatus 101 is valid (step S1101). When determining that the authentication function is not valid in the step S1101, the CPU 201 executes the processes of the step S703 and the subsequent steps. When determining that the authentication function is valid in the step S1101, the CPU 201 is transitioned from the sleep state to the standby state and turns on the LCD touch panel 500 (step S1102). Next, the CPU 201 displays an authentication login screen on the LCD touch panel 500 (step S1103).

The CPU 201 determines whether authentication login is performed based on a login operation performed by the user (step S1104). When determining that the authentication login is not performed in the step S1104, the CPU 201 stands by until the user performs the login operation. On the other hand, when determining that the authentication login is performed in the step S1104, the CPU 201 issues a display event of a destination number input screen (step S1105). Thereafter, the CPU 201 displays the destination number input screen on the LCD touch panel 500 (step S1106) and ends the present process.

According to the sleep return process of FIG. 11, the LCD touch panel 500 which receives the user's authentication operation is turned on if it is determined that the off-hook interrupt is received when the authentication function is valid. Accordingly, the user can perform the user authentication operation only by performing the off-hook without performing another operation such as pressing of the power saving key 509 serving as a return button from the sleep state. As a result, it is possible to improve convenience of the user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2015-254089, filed Dec. 25, 2015 which is hereby incorporated by reference herein in its entirety.

What is claimed is:

1. An information processing apparatus provided with a display unit, comprising:
    a first detection unit configured to detect whether a communication line is connected to the information processing apparatus;
    a second detection unit configured to detect an off-hook state in the information processing apparatus; and
    a display control unit configured to control whether to turn on said display unit,
    wherein said display control unit turns on said display unit in a case where said first detection unit detects connection of the communication line to the information processing apparatus and said second detection unit detects the off-hook state, and
    wherein said display control unit does not turn on said display unit in a case where said first detection unit detects non-connection of the communication line to the information processing apparatus and said second detection unit detects the off-hook state.

2. The information processing apparatus according to claim 1, wherein said display control unit displays a message, which indicates that the communication line is not connected to the information processing apparatus, on said display unit in a case where said first detection unit detects the non-connection of the communication line to the information processing apparatus.

3. The information processing apparatus according to claim 1, further comprising an incoming call reception unit configured to receive an incoming phone call,
    wherein said display control unit does not turn on said display unit in a case where said second detection unit detects the off-hook state while said incoming call reception unit is receiving the incoming phone call.

4. The information processing apparatus according to claim 1,
    wherein said display unit receives an authentication operation of a user, and
    wherein said display control unit turns on said display unit in a case where said second detection unit detects the off-hook state.

5. The information processing apparatus according to claim 1, wherein the off-hook state includes a state where a handset or an extension provided in the information processing apparatus is off-hooked.

6. The information processing apparatus according to claim 5, wherein said display control unit does not turn on said display unit in a case where the off-hook state is caused due to off-hook of the extension.

7. A control method for an information processing apparatus provided with a display unit, the control method comprising:
    detecting whether a communication line is connected to the information processing apparatus;
    detecting an off-hook state in the information processing apparatus; and
    controlling whether to turn on the display unit,
    wherein the display unit is turned on in a case where connection of the communication line to the information processing apparatus is detected and the off-hook state, and
    wherein the display unit is not turned in a case where non-connection of the communication line to the information processing apparatus is detected and the off-hook state is detected.

8. A computer-readable non-transitory storage medium storing a program for causing a computer to execute a control method for an information processing apparatus provided with a display unit, the control method comprising:
    detecting whether a communication line is connected to the information processing apparatus;
    detecting an off-hook state in the information processing apparatus; and
    controlling whether to turn on the display unit,
    wherein the display unit is turned on in a case where connection of the communication line to the information processing apparatus is detected and the off-hook state is detected, and
    wherein the display unit is not turned in a case where non-connection of the communication line to the information processing apparatus is detected and the off-hook state is detected.

9. The information processing apparatus according to claim 1, wherein said first detection unit detects whether the communication line is connected to the information processing apparatus after said second detection unit detects the off-hook state and after initiating a return of the information processing apparatus from a sleep mode in response to the detection of the off-hook state.

* * * * *